(12) United States Patent
Sazawa et al.

(10) Patent No.: US 9,485,189 B2
(45) Date of Patent: Nov. 1, 2016

(54) TRANSFER DEVICE, AND TRANSFER METHOD

(71) Applicant: FUJITSU LIMITED, Kawasaki-shi, Kanagawa (JP)

(72) Inventors: Shinichi Sazawa, Atsugi (JP); Yuichi Sato, Yamato (JP); Daichi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 13/926,495

(22) Filed: Jun. 25, 2013

(65) Prior Publication Data

US 2014/0068081 A1    Mar. 6, 2014

(30) Foreign Application Priority Data

Aug. 30, 2012 (JP) .................................. 2012-190631

(51) Int. Cl.
*G06F 15/16* (2006.01)
*H04L 12/911* (2013.01)
*H04L 29/06* (2006.01)

(52) U.S. Cl.
CPC ............ *H04L 47/70* (2013.01); *H04L 47/828* (2013.01); *H04L 69/08* (2013.01); *H04L 69/16* (2013.01)

(58) Field of Classification Search
USPC ....................................................... 370/395.21
See application file for complete search history.

(56) References Cited

U.S. PATENT DOCUMENTS

| 5,440,551 | A | * | 8/1995 | Suzuki | ..................... H04L 29/06 370/395.21 |
| 6,075,796 | A | * | 6/2000 | Katseff | ............... H04L 12/6418 370/466 |
| 6,757,255 | B1 | * | 6/2004 | Aoki | ....................... H04L 1/187 370/229 |
| 7,675,939 | B2 | | 3/2010 | Kawamura | |
| 8,107,500 | B2 | * | 1/2012 | Hamanaka | ............... H04L 47/10 370/252 |
| 2005/0213586 | A1 | | 9/2005 | Cyganski et al. | |
| 2010/0023828 | A1 | * | 1/2010 | Weinman | ................ H04L 41/06 714/748 |

(Continued)

FOREIGN PATENT DOCUMENTS

| JP | 2009-049506 | 3/2009 |
| JP | 2012-074928 | 4/2012 |
| WO | 02/51101 A1 | 6/2002 |
| WO | 2009/059851 A1 | 5/2009 |

OTHER PUBLICATIONS

Extended European Search Report of EP Patent Application 13172836.2 mailed Mar. 31, 2014, 7 pages.

(Continued)

*Primary Examiner* — Brian J Gillis
*Assistant Examiner* — Kamran Mohammadi
(74) *Attorney, Agent, or Firm* — Fujitsu Patent Center

(57) ABSTRACT

A transfer device allocates, within the range of the maximum communication band of a network that a plurality of groups of applications use in common, a communication band equal to or larger than the minimum band for each of the groups. Furthermore, the transfer device converts, within a communication band allocated to each group, TCP data received from a transmission source of data to UDP data, transfers the UDP data to a transmission destination, and retransmits retransmission data in response to a retransmission request of the UDP data.

9 Claims, 12 Drawing Sheets

(56) References Cited

U.S. PATENT DOCUMENTS

| | | | |
|---|---|---|---|
| 2010/0235701 A1* | 9/2010 | Choo | H04L 1/0002 714/748 |
| 2012/0079065 A1 | 3/2012 | Miyamoto | |
| 2012/0221678 A1* | 8/2012 | Tanaka | H04L 1/1835 709/217 |

OTHER PUBLICATIONS

JPOA—Japanese Office Action mailed on Feb. 2, 2016 for Japanese Patent Application No. 2012-190631, with partial English Translation.

* cited by examiner

| IDENTIFICATION NUMBER | TCP PACKET | DATA SIZE T(X) | DATA SIZE R(X) |
|---|---|---|---|
| 1 | DATA OF TCP PACKET | T(1) | R(1) |
| 2 | DATA OF TCP PACKET | T(2) | R(2) |
| 3 | DATA OF TCP PACKET | T(3) | R(3) |
| ... | | | |
| N | DATA OF TCP PACKET | T(N) | R(N) |

FIG.5

| UDP HEADER | RPS HEADER | SendReqID | CurSendOffset |

FIG.6

| UDP HEADER | RPS HEADER | Send ReqID | CurSend Offset | Loss Cnt | SackID | Sack MaxID | Ack Data |

TRANSFER DEVICE, AND TRANSFER METHOD

CROSS-REFERENCE TO RELATED APPLICATION

This application is based upon and claims the benefit of priority of the prior Japanese Patent Application No. 2012-190631, filed on Aug. 30, 2012, the entire contents of which are incorporated herein by reference.

FIELD

The embodiment discussed herein is related to a transfer device or the like.

BACKGROUND

In recent years, there has existed cloud computing in which a plurality of applications are collaboratively operated on a network thus providing services to users.

In a computer network, for the reliability of data communication, a connection-oriented protocol typified by a transmission control protocol (TCP) is generally used. However, when each application uses the TCP to perform data communication, processing for establishing connection in a handshake process or processing for the acknowledgement of data transfer occurs; for example, when a communication range is long, there exists a case that delay occurs even when a network band is sufficient.

To prevent the occurrence of the delay, there exists a conventional technique substituted for the TCP. FIG. 13 is a view for explaining one example of the conventional technique. In the example illustrated in FIG. 13, an application 10 transmits data to a TCP client 15, and the TCP client 15 transmits a TCP packet to relay software 20.

The relay software 20 captures the TCP packet and converts the TCP packet into a user datagram protocol (UDP) that is a connectionless protocol and a retransmission algorithm to perform data transfer. To be more specific, the relay software 20 converts the TCP packet to a UDP packet to perform data transfer by the UDP. Furthermore, the relay software 20 divides an application layer in two and provides a high-speed transfer unit provided with a retransmission algorithm for performing recovery for dealing with missed data by the UDP or band control. These related-art examples are described, for example in Japanese Laid-open Patent Publication No. 2009-49506.

However, in the above-mentioned conventional technique, there has been a drawback that a communication band is not sufficiently allocated to a group of applications with a smaller amount of data communication, thus causing congestion in retransmission of data.

FIG. 14 is a view for explaining a drawback in the conventional technique. In an example illustrated in FIG. 14, transfer devices 30a and 30b are connected to each other via a network 50. The transfer device 30a has applications 15a, 15b, and 15c, and relay software 20a. The transfer device 30b has applications 16a, 16b, and 16c, and relay software 20b.

For example, the application 15a is a low performance application whose amount of data communication is small and uses the relay software 20a and 20b to perform data communication with the application 16a. The application 15b is a high performance application whose amount of data communication is large and uses the relay software 20a and 20b to perform data communication with the application 16b. The application 15c is a low performance application whose amount of data communication is small and performs data communication with the application 16c. The relay software 20a or 20b corresponds to the relay software 20 illustrated in FIG. 13.

The conventional relay software 20a or 20b allocates a communication band depending on the performance of each application without considering the maximum communication band of the network 50. Therefore, there exists the case that the relay software 20a or 20b allocates a large communication band to a group of the high performance applications 15b and 16b. In this manner, when the relay software 20a or 20b allocates a communication band to each application, the communication band of the network 50 is occupied, and sufficient communication band is not allocated between the applications 15a and 16a or between the applications 15c and 16c thus causing congestion in retransmission of data.

SUMMARY

According to an aspect of an embodiment, a transfer device includes a band allocation unit that allocates, within the range of the maximum communication band of a communication line that a plurality of groups of transmission sources and transmission destinations of data use in common, the minimum communication band to each of the groups; and a transfer control unit that, within the communication band allocated to each group by the band allocation unit, converts the data to conversion data transmitted and received with a protocol different from that with which data is received from the corresponding transmission source, transfers the conversion data to the corresponding transmission destination, and retransmits retransmission data in response to a retransmission request of the conversion data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a view illustrating one example of a data structure of a reception status confirmation packet;

FIG. 6 is a view illustrating one example of a data structure of a reception status response packet;

DESCRIPTION OF EMBODIMENT

Preferred embodiments of the present invention will be explained with reference to accompanying drawings. Here, the present invention is not limited to the embodiment.

Figure 1:
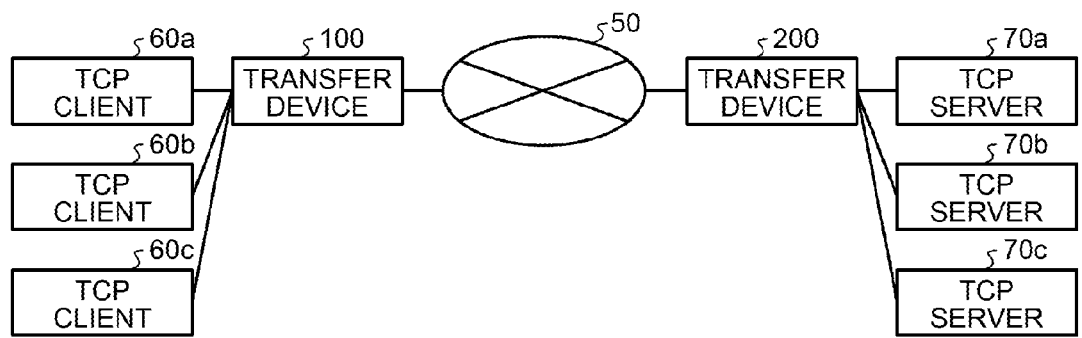
FIG. 1 is a view illustrating a constitution of a system according to the present embodiment.

Next, a system according to the present embodiment is explained. FIG. 1 is a view illustrating a constitution of the system in the present embodiment. As illustrated in FIG. 1, the system has TCP clients 60a, 60b, and 60c, TCP servers 70a, 70b, and 70c, and transfer devices 100 and 200. Here, as one example, the TCP clients 60a to 60c and the TCP servers 70a to 70c are illustrated; however, other TCP clients or TCP servers may be connected. In explanations below, the TCP clients 60a to 60c are referred to collectively as a TCP client 60. The TCP servers 70a to 70c are referred to collectively as a TCP server 70.

The TCP client 60 is connected to the transfer device 100. The TCP server 70 is connected to the transfer device 200. The transfer device 100 and the transfer device 200 are connected to each other via a network 50. The TCP client 60 and the TCP server 70 execute data communication via the transfer devices 100 and 200.

Figure 2:
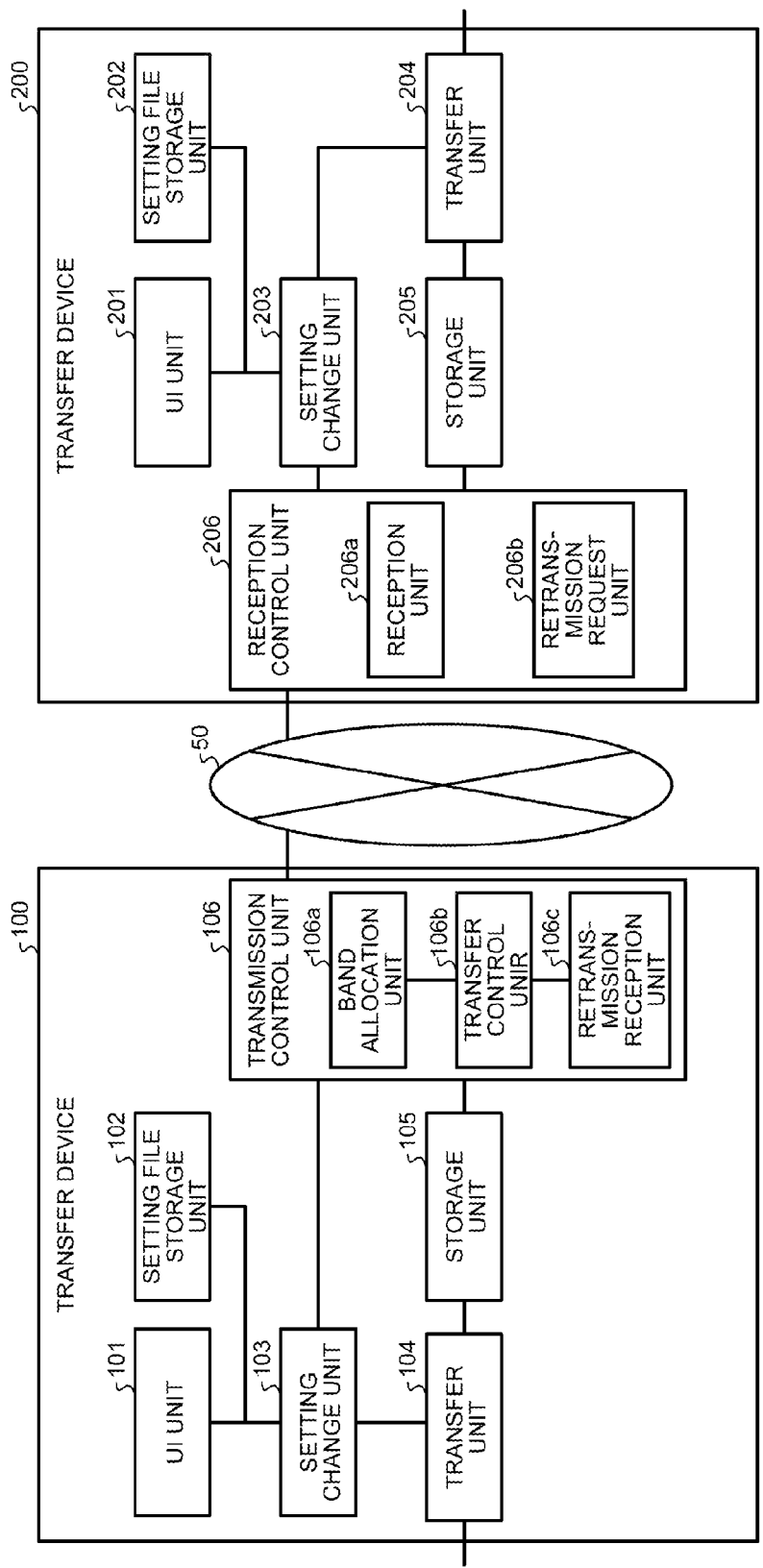
FIG. 2 is a functional block diagram illustrating a constitution of a transfer device in the present embodiment.

The constitutions of the transfer devices 100 and 200 illustrated in FIG. 1 are explained. FIG. 2 is a functional block diagram illustrating the constitutions of the transfer devices according to the present embodiment. As illustrated in FIG. 2, the transfer device 100 has a user interface (UI) unit 101, a setting file storage unit 102, a setting change unit 103, a transfer unit 104, a storage unit 105, and a transmission control unit 106. The transfer device 200 has a UI unit 201, a setting file storage unit 202, a setting change unit 203, a transfer unit 204, a storage unit 205, and a reception control unit 206.

First of all, the constitution of the transfer device 100 is explained. The UI unit 101 is an input unit by which a user inputs various kinds of information. For example, the UI unit 101 corresponds to an input device such as a keyboard or a touch panel. The user operates the UI unit 101 to input various kinds of setting information. The various kinds of setting information input from the UI unit 101 are stored in the setting file storage unit 102.

The setting file storage unit 102 is a storage unit for storing therein the various kinds of setting information. The setting change unit 103 is a processing unit for properly changing the setting of the transfer unit 104 or the transmission control unit 106 based on the setting information stored in the setting file storage unit 102.

The transfer unit 104 is a processing unit that establishes connection with the TCP client 60 and receives a TCP packet from the TCP client 60. The transfer unit 104 stores the TCP packet in the storage unit 105. The transfer unit 104 stores the TCP packet in the storage unit 105 for each TCP client 60. Furthermore, the transfer unit 104 stores a data size per unit time of the TCP packet received from the TCP client 60 in the storage unit 105.

Figures 3, 4:
FIG. 3 is a view illustrating one example of a data structure of a storage unit in the present embodiment.
FIG. 4 is a view illustrating one example of a data structure of a UDP packet generated by a transfer control unit.

The storage unit 105 is a storage device that stores therein a TCP packet. FIG. 3 is a view illustrating one example of a data structure of a storage unit in the present embodiment.

As illustrated in FIG. 3, the storage unit 105 stores therein an identification number, a TCP packet, a data size T(X), and a data size R(X) that are associated with each other. The identification number indicates information for uniquely identifying a group of the TCP client 60 and the TCP server 70 that perform data communication. The TCP packet indicates data of a TCP packet received from the TCP client 60. The data size T(X) indicates a total size of the TCP packets per unit time. The data size R(X) indicates a total size of retransmission packets retransmitted to the transfer device 200 per unit time. The retransmission packet is a UDP packet subject to a retransmission request from the transfer device 200 that is a transmission destination.

The transmission control unit 106 is a processing unit that converts a TCP packet to a UDP packet and performs data transfer by using the UDP packet. Furthermore, the transmission control unit 106 performs recovery of missed data by a UDP and band control between a TCP client and a TCP server. The transmission control unit 106 has a band allocation unit 106a, a transfer control unit 106b, and a retransmission reception unit 106c.

The band allocation unit 106a is a processing unit that allocates a communication band equal to or larger than the minimum band to each group of the TCP client 60 and the TCP server 70. To be more specific, the band allocation unit 106a calculates, as mentioned below, a band to be allocated to each group of the TCP client 60 and the TCP server 70. The band allocation unit 106a outputs calculation results to the transfer control unit 106b.

Here, processing of the band allocation unit 106a is specifically explained. First, the band allocation unit 106a refers to the storage unit 105 and calculates TotalSize based on an expression (1). The TotalSize is a total value of data amounts per unit time in the data communication between the TCP client 60 and the TCP server 70.

$$\text{TotalSize} = T(1) + \ldots T(N) + R(1) + \ldots R(N) \quad (1)$$

The band allocation unit 106a compares the maximum band of the network 50 with the TotalSize and determines whether or not the maximum band is larger than the TotalSize. For example, the information of the maximum band is set in advance by a user.

The case that the maximum band is larger than the TotalSize is explained. The band allocation unit 106a notifies the transfer control unit 106b that all of data are to be transmitted.

The case that the maximum band is equal to or smaller than the TotalSize is explained. The band allocation unit 106a refers to the storage unit 105 and calculates "Bnow" based on an expression (2). In the expression (2), B(bps) is the maximum band of the network 50, and b(bps) is the minimum band to be allocated to each group of the TCP client 60 and the TCP server 70. The value of the minimum band b is, for example, set in advance by a user. Here, in the expression (2), min(b, R(x)) is a function that selects a value of smaller one out of b and R(x). That is, it is reasonable to say that "Bnow" is a remaining band value obtained by subtracting a total value of minimum bands to be allocated to the respective groups of the TCP clients 60 and the TCP servers 70 from the maximum band value.

$$\text{Remaining band}(Bnow) = B - \Sigma(\min(b, R(x)) \quad (2)$$

The band allocation unit 106a calculates "Bnow" and, thereafter, calculates "Total(X)" of each group based on expression (3). The "Total(X)" is a band to be allocated to each group of the TCP client 60 and the TCP server 70 when the UDP packet and the retransmission packet are transmitted. For example, Total(1) indicates a band to be allocated to a group of the TCP client 60 and the TCP server 70. The band allocation unit 106a notifies the transfer control unit 106b of the information of the "Total(X)" as a calculation result.

$$Total(X)=\min(b,R(x))+Bnow\times(T(X)+R(X))/TotalSize \quad (3)$$

The transfer control unit 106b is a processing unit that establishes connection with the transfer device 200, converts a TCP packet to a UDP packet, and transmits the UDP packet to the transfer device 200. For example, the transfer control unit 106b encapsulates the TCP packet and imparts a UDP header thereto and thus generates a UDP packet. Furthermore, the transfer control unit 106b stores the UDP packet in the storage unit 105 in preparation for a retransmission. The transfer control unit 106b transmits, when receiving a retransmission request, a retransmission packet to the transfer device 200 in priority to an untransmitted UDP packet.

FIG. 4 is a view illustrating one example of a data structure of a UDP packet generated by a transfer control unit. As illustrated in FIG. 4, for example, the UDP packet includes a UDP header, an RPS header, and a transmission data part. The RPS header includes an offset of transmission data and an offset of data whose reception completion notice is received. Furthermore, the UDP header includes an identification (ID) for uniquely identifying the UDP packet. In addition, the transmission data part includes a TCP packet encapsulated.

Processing when the transfer control unit 106b acquires, from the band allocation unit 106a, information that all of data are transmitted is explained. The transfer control unit 106b converts a TCP packet stored in the storage unit 105 to a UDP packet and transmits the converted UDP packet to the transfer device 200. Furthermore, the transfer control unit 106b extracts, when acquiring the ID of the UDP packet to be retransmitted from the retransmission reception unit 106c, the UDP packet to be retransmitted from the storage unit 105 and retransmits the UDP packet to the transfer device 200. The UDP packet to be retransmitted corresponds to the above-mentioned retransmission packet.

Processing when the transfer control unit 106b acquires the Total(X) of each group is explained. The transfer control unit 106b performs processing for transmitting a retransmission packet to the transfer device 200 in priority to an untransmitted UDP packet. The transfer control unit 106b calculates, based on an expression (4), a remaining band when preferentially transmitting the retransmission packet, converts a TCP packet to a UDP packet, and transmits the UDP packet in the range of the remaining band calculated.

For example, a band to be allocated to a group of the TCP client 60a and the TCP server 70a is designated as Total(1) that is set to 100M(bps). Furthermore, T(1) is set to 60M(bps), and R(M) is set to 60M(bps). In this case, the transfer control unit 106b allocates 60M(bps) out of 100 M(bps) of the Total(1) to the data transfer of the retransmission packet, and allocates remaining 40M(bps) to the data transfer of the untransmitted UDP packet.

In this manner, the transfer control unit 106b preferentially transmits the retransmission packet and thus supplies UDP packets that have not arrived at the transfer device 200 in order from a temporally older packet. For example, it is possible to fix the problem such that a temporally new UDP packet can be received whereas a temporally old UDP packet which is subjected to a retransmission request is not indefinitely received.

$$Total(X)-R(X) \quad (4)$$

The retransmission reception unit 106c is a processing unit that receives an ID of a UDP packet to be retransmitted from the transfer device 200. For example, the retransmission reception unit 106c transmits a reception status confirmation packet to the transfer device 200 and receives a reception status response packet that is a response to the reception status confirmation packet. The reception status response packet includes the ID of the UDP packet to be transmitted.

FIG. 5 is a view illustrating one example of a data structure of the reception status confirmation packet. As illustrated in FIG. 5, the reception status confirmation packet includes a UDP header, an RPS header, a SendReqID, and a CurSendOffset. The SendReqID indicates the number of reception status responses received. The CurSendOffset indicates a position from the head of data transmitted.

FIG. 6 is a view illustrating one example of a data structure of the reception status response packet. As illustrated in FIG. 6, the reception status response packet includes a UDP header, an RPS header, a SendReqID, and a CurSendOffset. Furthermore, the reception status response packet includes a LossCnt, a SackID, a SackMaxID, and an AckData. The LossCnt indicates the total number of packets received. The SackID indicates the number of the AckData included in the reception status response packet. The SackMaxID indicates the total number of the AckData. The AckData includes a start ID and an end ID of the UDP packet received. For example, the retransmission reception unit 106c refers to the AckData and thus identifies the ID of the UDP packet to be retransmitted.

The retransmission reception unit 106c outputs the ID of the retransmission packet to the transfer control unit 106b. Furthermore, the retransmission reception unit 106c adds the amount of data per unit time of the retransmission packet to the R(X) and updates the storage unit 105.

Next, the constitution of the transfer device 200 is explained. The UI unit 201 is an input unit by which a user inputs various kinds of information. For example, the UI unit 201 corresponds to an input device such as a keyboard or a touch panel. The user operates the UI unit 201 to input various kinds of information. Various kinds of setting information input from the UI unit 201 are stored in the setting file storage unit 202.

The setting file storage unit 202 is a storage device that stores therein various kinds of setting information. The setting change unit 203 is a processing unit that properly changes the setting of the transfer unit 204 or the reception control unit 206 based on the setting information stored in the setting file storage unit 202.

The transfer unit 204 is a processing unit that establishes the connection with the TCP server 70 and transfers a TCP packet stored in the storage unit 205 to the TCP server 70.

The storage unit 205 stores therein a TCP packet corresponding to each group of the TCP client 60 and the TCP server 70. Furthermore, the storage unit 205 stores therein packet reception information. The packet reception information is information used for determining an unreceived UDP packet.

Figure 7:
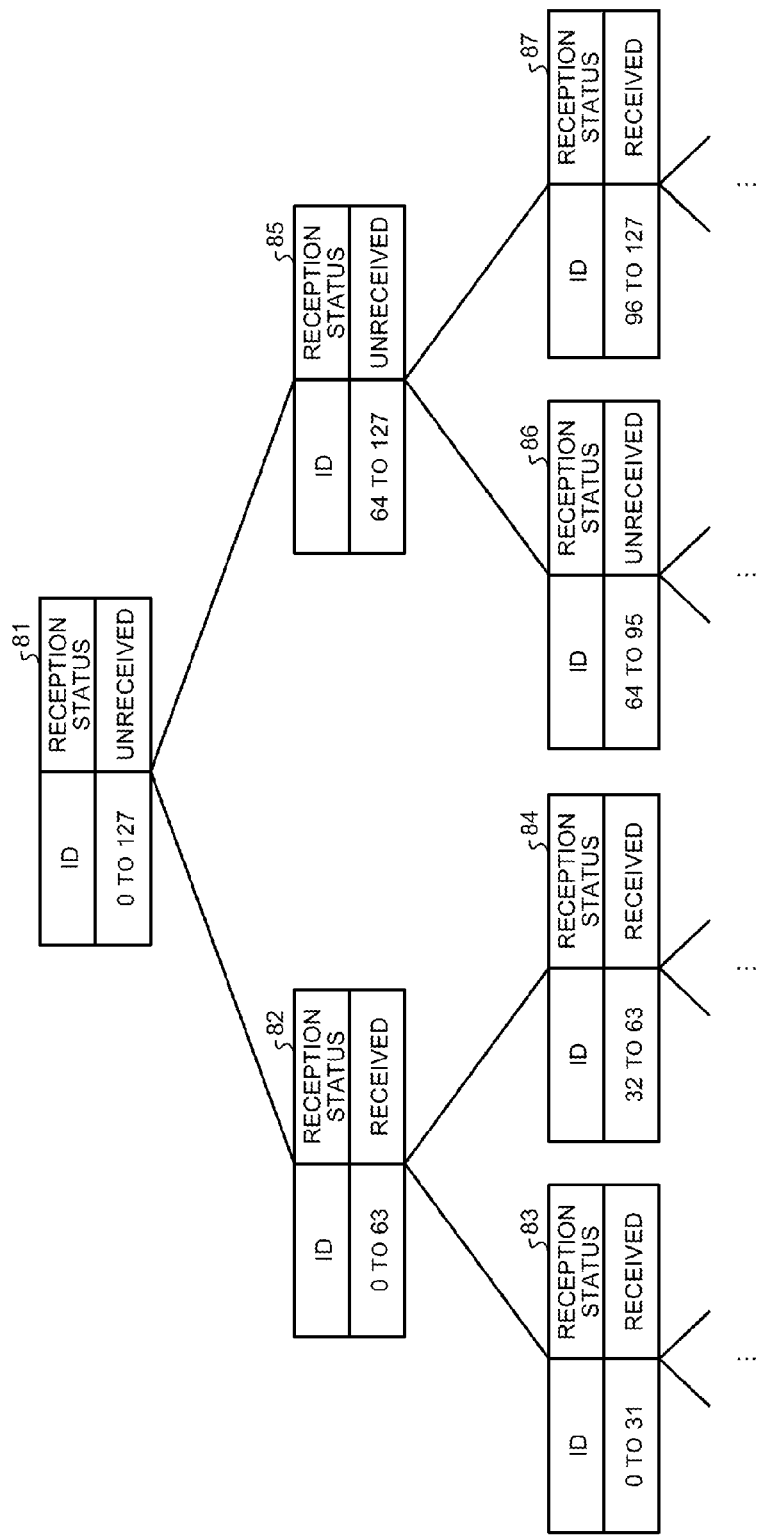
FIG. 7 is a view illustrating one example of a data structure of packet reception information in the present embodiment.

FIG. 7 is a view illustrating one example of a data structure of packet reception information according to the present embodiment. As illustrated in FIG. 7, the packet reception information has a tree-shaped structure constituted of nodes 81 to 87. In each of the nodes 81 to 87, an ID for uniquely identifying a UDP packet and a reception status are associated with each other. The node 81 is connected to the nodes 82 and 85. The node 82 is connected to the nodes 83 and 84. The node 85 is connected to the nodes 86 and 87.

In FIG. 7, in the node 81, the reception status is "unreceived". Accordingly, the node 81 indicates that any UDP packet out of UDP packets identified by the IDs 0 to 127 is not received.

In the node 82, the reception status is "received". Accordingly, the node 82 indicates that UDP packets identified by IDs 0 to 63 are all received. In the node 83, the reception status is "received". Accordingly, the node 83 indicates that UDP packets identified by IDs 0 to 31 are all received. In the node 84, the reception status is "received". Accordingly, UDP packets identified by IDs 32 to 63 are all received.

In the node 85, the reception status is "unreceived". Accordingly, the node 85 indicates that any UDP packet out of UDP packets identified by IDs 64 to 127 is not received. In the node 86, the reception status is "unreceived". Accordingly, the node 86 indicates that any UDP packet out of UDP packets identified by IDs 64 to 95 is not received. In the node 87, the reception status is "received". Accordingly, the node 87 indicates that UDP packets identified by IDs 96 to 127 are all received. In the nodes each of which has packet reception information, by tracing each node in which the reception status is "unreceived", the ID of an unreceived UDP packet can be identified.

The reception control unit 206 receives a UDP packet from the transfer device 100, converts the UDP packet to a TCP packet, and sequentially stores the TCP packet in the storage unit 205. Furthermore, the reception control unit 206 transmits the information of an unreceived UDP packet to the transfer device 100 and requests retransmission of the unreceived UDP packet. The reception control unit 206 has a reception unit 206a and a retransmission request unit 206b.

The reception unit 206a receives a UDP packet from the transfer unit, converts the UDP packet received to a TCP packet, and sequentially stores the TCP packet in the storage unit 205. For example, the reception unit 206a extracts an encapsulated TCP packet included in the UDP packet and stores the TCP packet in the storage unit 205. Furthermore, the reception unit 206a generates the packet reception information illustrated in FIG. 7 based on the ID included in the UDP packet.

Figure 8:
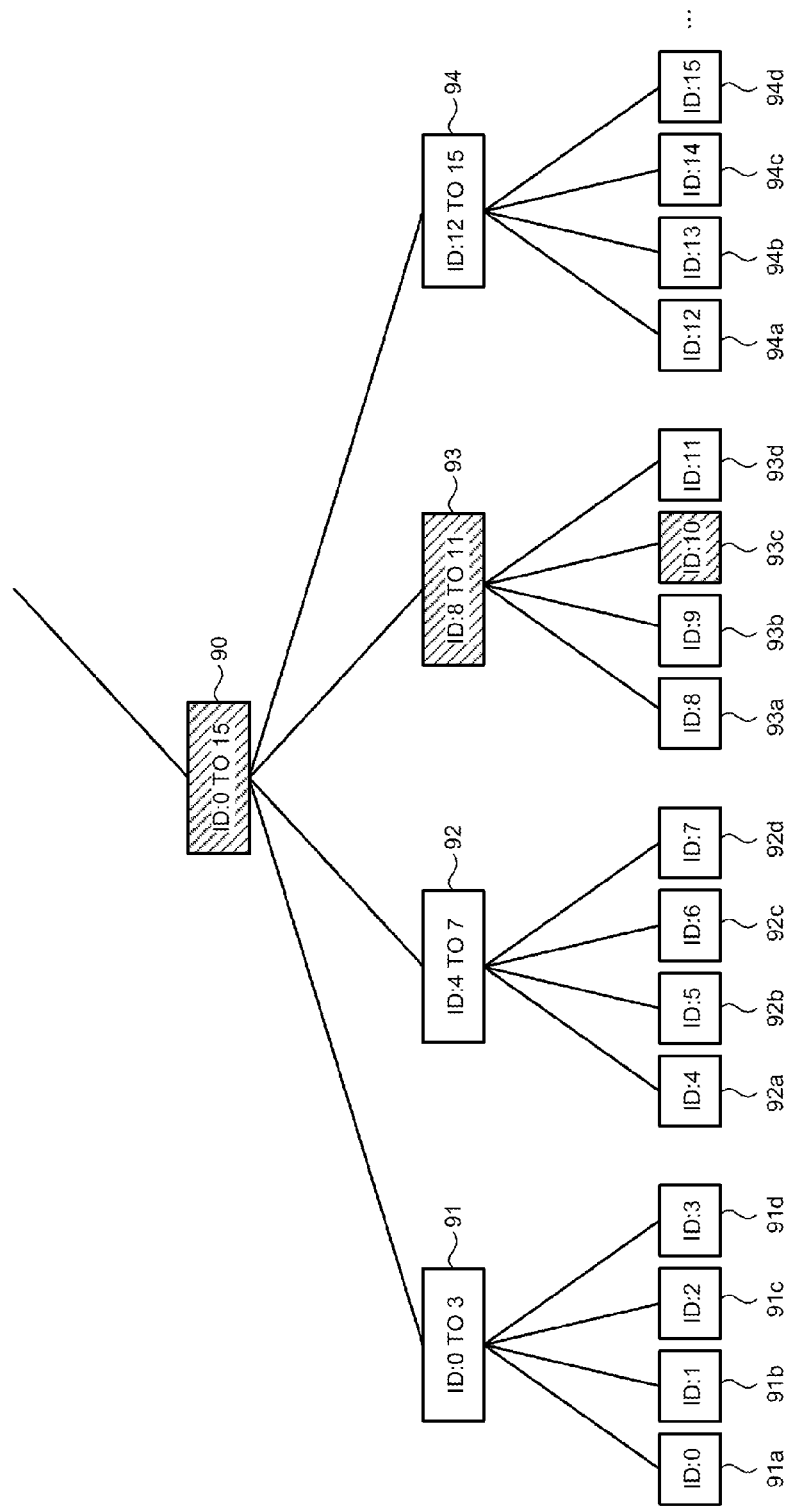
FIG. 8 is a view illustrating one example of processing for generating the packet reception information.

Here, one example of processing in which the reception unit 206a generates packet reception information is explained. FIG. 8 is a view illustrating one example of processing for generating the packet reception information. In FIG. 8, illustrations of reception statuses are omitted. As illustrated in FIG. 8, the reception unit 206a receives UDP packets of IDs 0 to 3 and, thereat, generates nodes 91a to 91d corresponding to the IDs 0 to 3 and sets the reception status of each of the nodes 91a to 91d to "received". Furthermore, the reception unit 206a generates a node 91 and sets a status that the UDP packets of the IDs 0 to 3 have been received to the node 91.

The reception unit 206a receives UDP packets of IDs 4 to 7 and, thereat, generates nodes 92a to 92d corresponding to the IDs 4 to 7 and sets the reception status of each of the nodes 92a to 92d to "received". Furthermore, the reception unit 206a generates a node 92 and sets a status that the UDP packets of the IDs 4 to 7 have been received to the node 92.

The reception unit 206a receives UDP packets of IDs 8, 9, and 11 and, thereat, generates nodes 93a to 93d corresponding to IDs 8 to 11, and sets the reception status of each of the nodes 93a, 93b, and 93d to "received". The reception unit 206a sets, since the UDP packet of the ID 10 is not received, the reception status of the node 93c to "unreceived". Furthermore, the reception unit 206a generates a node 93 and sets the reception status corresponding to each of the IDs 8 to 11 to "unreceived". The reception unit 206a receives UDP packets of IDs 12 to 15 and, thereat, generates nodes 94a to 94d corresponding to the IDs 12 to 15 and sets the reception status of each of the nodes 94a to 94d to "received". Furthermore, the reception unit 206a generates a node 94 and sets a status that the UDP packets of the IDs 12 to 15 have been received to the node 94.

The reception unit 206a generates the nodes 91 to 94 and, thereafter, generates a node 90. The reception unit 206a sets, since the reception status of the node 93 is "unreceived", the reception status corresponding to each of the IDs 0 to 15 to "unreceived". The reception unit 206a repeatedly performs the above-mentioned processing every time when receiving the UDP packet and thus generates the packet reception information.

The retransmission request unit 206b receives a reception status confirmation packet from the transfer device 100, identifies an ID of an unreceived UDP packet based on the packet reception information in the storage unit 205, and notifies the transfer device 100 of the ID identified and thus requests retransmission of the unreceived UDP packet. The retransmission request unit 206b traces, among the nodes each of which has packet reception information, each node in which the reception status is "unreceived" and thus identifies the ID of an unreceived UDP packet. The retransmission request unit 206b generates the reception status response packet and transmits the packet to the transfer device 100. For example, in the example illustrated in FIG. 8, the retransmission request unit 206b identifies, when tracing each node in which the reception status is "unreceived", the node 93 and thus determines that the UDP packet of the ID 10 is not received.

Figure 9:
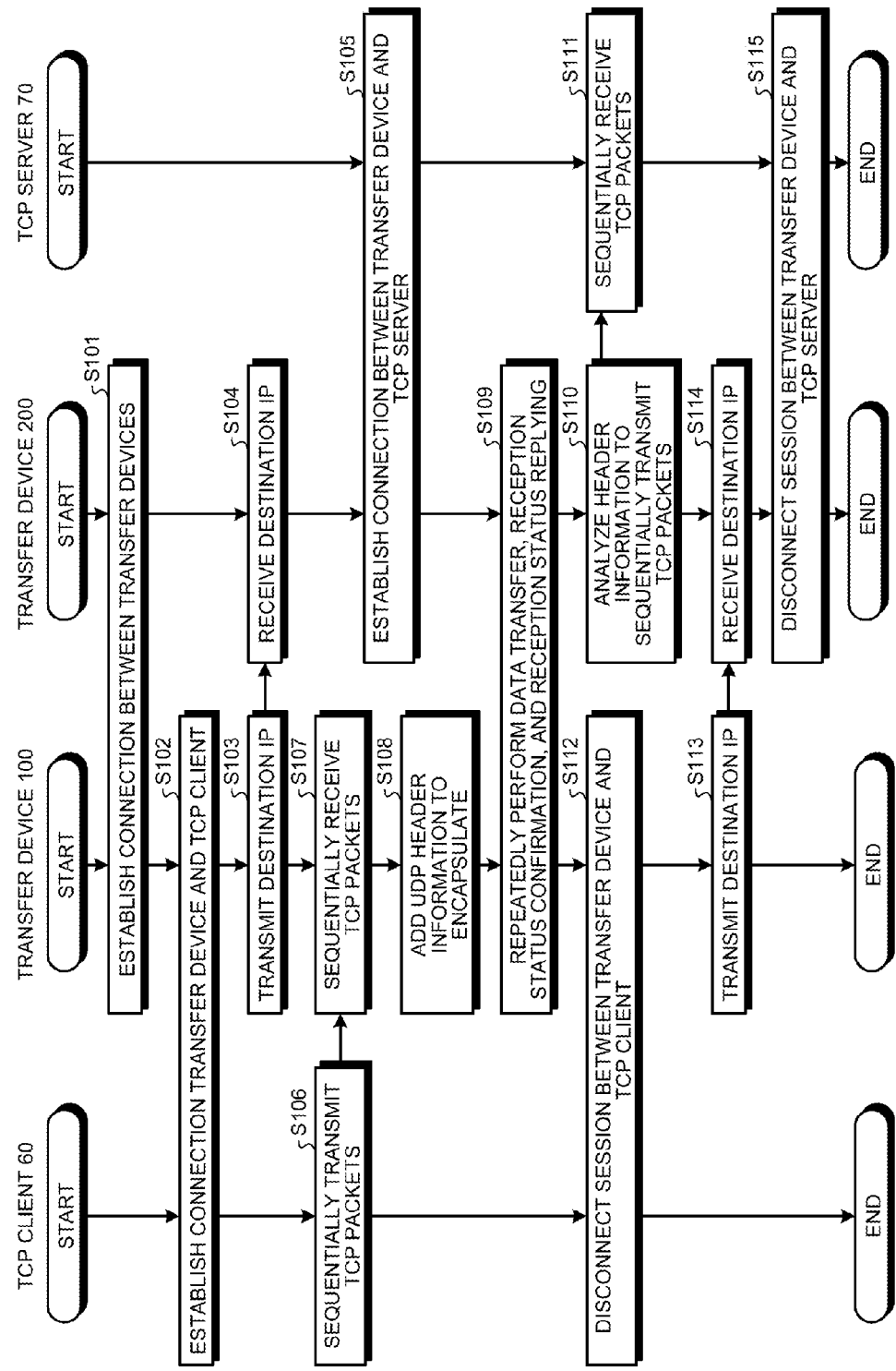
FIG. 9 is a flowchart illustrating processing procedures in a system in the present embodiment.

Next, processing procedures of the system according to the present embodiment is explained. FIG. 9 is a flowchart illustrating processing procedures in the system according to the present embodiment. As illustrated in FIG. 9, connection between the transfer device 100 and the transfer device 200 is established (S101). Connection between the TCP client 60 and the transfer device 100 is established (S102).

The transfer device 100 transmits a destination IP to the transfer device 200 (S103), and the transfer device 200 receives the destination IP (S104). In S103 and S104, the destination IP corresponds to the IP address of the TCP server 70 with which the TCP client 60 performs data communication.

A connection between the transfer device 200 and the TCP server 70 is established (S105). The TCP client 60 sequentially transmits TCP packets (S106), and the transfer device 100 sequentially receives the TCP packets (S107).

The transfer device 100 adds a UDP header to a TCP packet to encapsulate the TCP packet (S108). The transfer device 100, together with the transfer device 200, repeatedly performs data transfer, reception status confirmation, and reception status replying of a UDP packet or a retransmission packet (S109). In S109, the transfer device 100 calculates a band to be allocated to a group of the TCP client 60 and the TCP server 70 and performs data transfer within the band calculated.

The transfer device 200 analyzes header information to sequentially transmit a TCP packet to the TCP server 70 (S110), and the TCP server 70 sequentially receives the TCP packet (S111). After the completion of TCP-packet transfer from the TCP client 60, a session between the TCP client 60 and the transfer device 100 is disconnected (S112).

Figure 10:
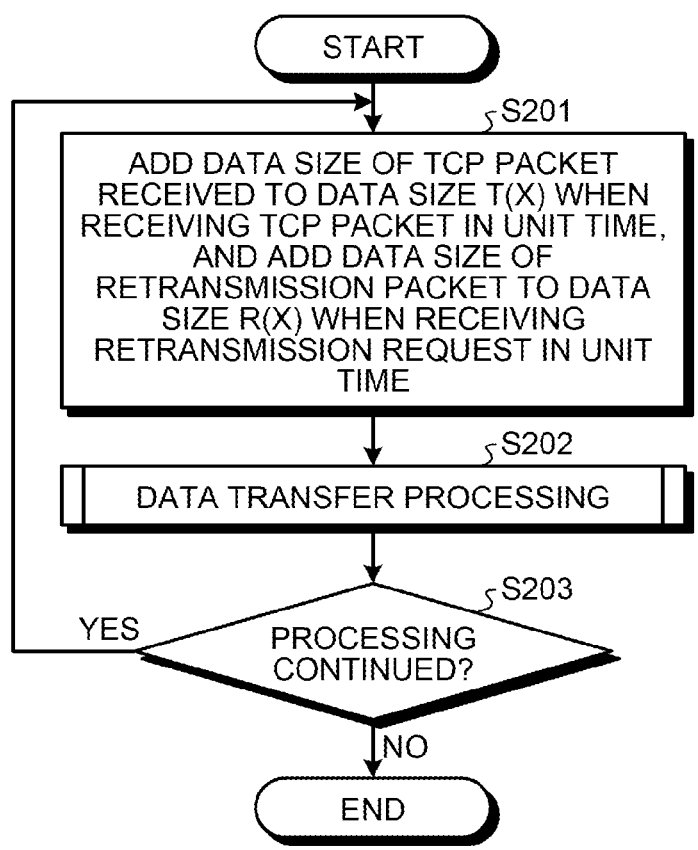
FIG. 10 is a flowchart illustrating processing procedures of data transfer in the present embodiment.

The transfer device 100 transmits a destination IP to the transfer device 200 (S113), and the transfer device 200 receives the destination IP (S114). In S113 and S114, the destination ID corresponds to the IP address of the TCP server 70 with which the TCP client 60 finishes data communication. A session between the transfer device 200 and the TCP server 70 is disconnected (S115). Next, processing procedures by which the transfer device 100 performs data transfer is explained. FIG. 10 is a flowchart illustrating processing procedures of data transfer according to the present embodiment. For example, the processing illustrated in FIG. 10 is performed at a time when the transfer device 100 starts the reception of a TCP packet from the TCP client 60.

As illustrated in FIG. 10, the transfer device 100 adds, when receiving a TCP packet in a unit time, the data size of the TCP packet received to the data size T(X). Furthermore, the transfer device 100 adds, when receiving a retransmission request in a unit time, the data size of the retransmission packet to the data size R(X) (S201).

The transfer device 100 performs data transfer processing (S202) and, when continuing processing (Yes at S203), advances the processing to S201 again. On the other hand, the transfer device 100 finishes the processing when discontinuing the processing (No at S203). That is, the transfer device 100 repeatedly performs, while continuing the processing, processing in S201 and 5202 for every predetermined unit time.

Figure 11:
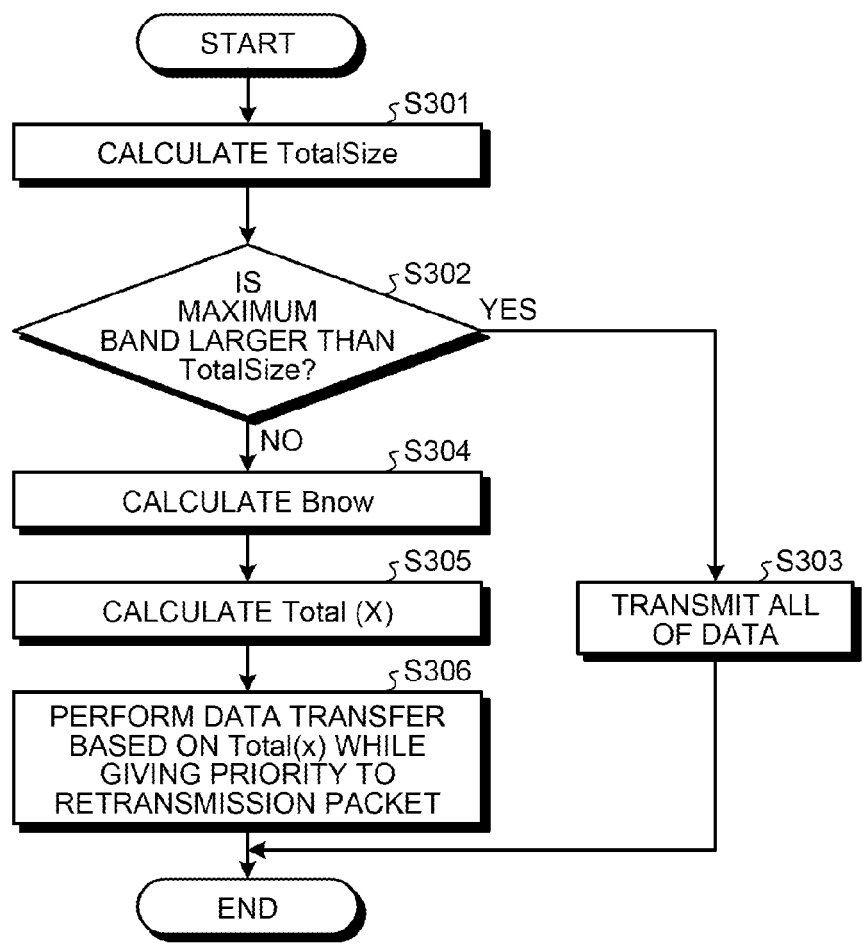
FIG. 11 is a flowchart illustrating procedures of data transfer processing.

Next, the data transfer processing in S202 illustrated in FIG. 10 is explained. FIG. 11 is a flowchart illustrating processing procedures of the data transfer processing. As illustrated in FIG. 11, the transfer device 100 calculates TotalSize (S301). In S301, the transfer device 100 calculates TotalSize based on the expression (1).

The transfer device 100 determines whether or not the maximum band is larger than TotalSize (S302). The transfer device 100 transmits, when the maximum band is larger than TotalSize (Yes at S302), all of data (S303).

The transfer device 100 calculates, when the maximum band is not larger than TotalSize (No at S302), Bnow (S304). In S304, the transfer device 100 calculates Bnow based on the expression (2).

The transfer device 100 calculates Total(X) for each group of the TCP client 60 and the TCP server 70 (S305). In S305, the transfer device 100 calculates Total(X) based on the expression (3).

The transfer device 100 performs, based on Total(X), data transfer of a UDP packet and a retransmission packet while giving priority to the retransmission packet (S306).

Next, advantageous effects of the transfer device 100 according to the present embodiment are explained. The transfer device 100 allocates, within the range of the maximum communication band of a communication line that a plurality of groups of applications use in common, a communication band equal to or larger than the minimum band for each of the groups of applications and controls transfer and retransmission of UDP data. Hence, according to the transfer device 100, it is possible to ensure a communication band that is sufficient for retransmitting the retransmission packet; for example, it is possible to prevent congestion in retransmission of data even in the case of a group of applications with a small amount of data communication.

Furthermore, according to the transfer device 100, a communication band allocated to each of a plurality of groups of applications is calculated by adding the minimum communication band and a communication band corresponding to the amount of data communication transmitted and received by the group of applications. Hence, according to the transfer device 100, it is possible to equally allocate a communication band to each group of applications; for example, it is possible to prevent, while operating an application using a high band, from disabling data communication by the other application using a low band. Furthermore, it is possible to make full use of available communication bands.

Furthermore, the transfer device 100 preferentially transmits the retransmission packet and performs data transfer of remaining UDP data within the range of a communication band obtained by subtracting a communication band used for transmitting the retransmission packet from the communication band allocated to a group of applications. Accordingly, the retransmission packet can be transferred early and thus supply preferentially a packet lacking in the transfer device 200.

Furthermore, the transfer device 200 generates packet reception information having a tree-shaped structure based on an ID of a UDP packet received and a reception status. In addition, the transfer device 200 transmits a retransmission request to the transfer device 100 based on the packet reception information. Accordingly, it is possible to identify an ID of an unreceived UDP packet without sequentially confirming the ID of the unreceived UDP packet from a start ID to an end ID. For example, an amount of calculation for identifying the ID of the unreceived UDP packet becomes (logN). This can prevent a phenomenon in which it takes time for an ACK request and a packet queue becomes full, and thus a packet loss increases.

Here, the constitution of the transfer device 100 or 200 is not limited to that illustrated in FIG. 2. For example, the transfer device 100 may have the function of the reception control unit 206 in the transfer device 200. Furthermore, the transfer device 200 may have the function of the transmission control unit 106 in the transfer device 100. Then, the transfer device 200 may receive a TCP packet from the TCP client 60 and perform data transmission to the transfer device 100, and the transfer device 100 may transmit a TCP packet to the TCP server 70.

Figure 12:
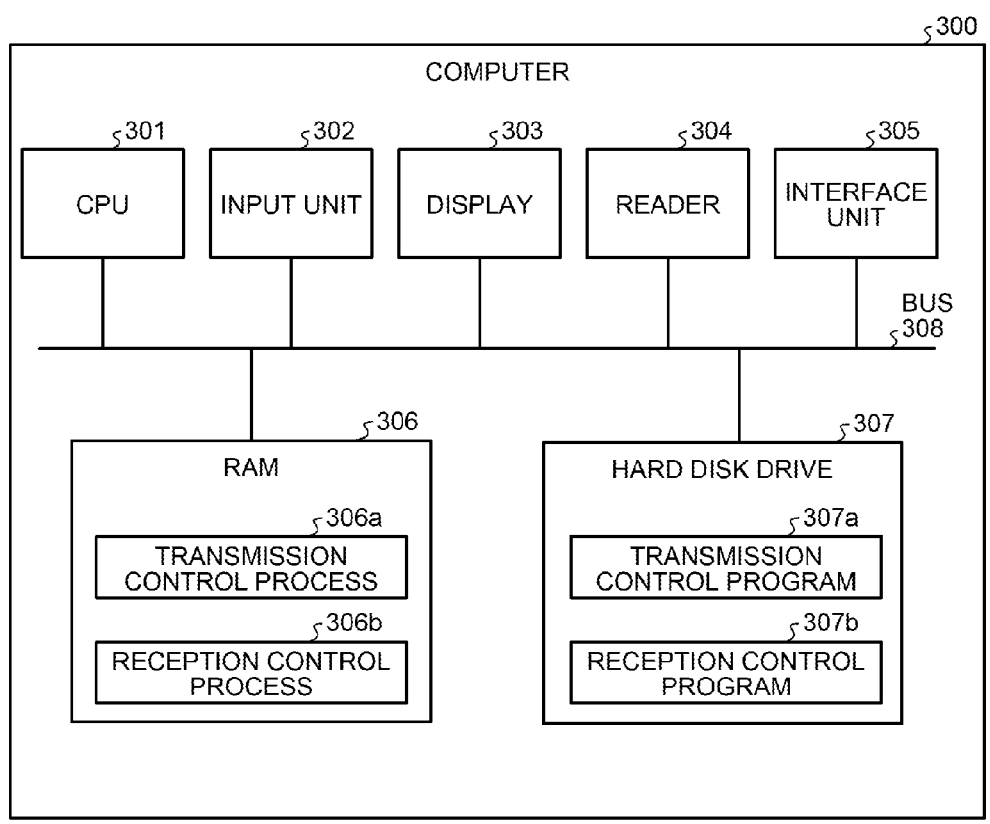
FIG. 12 is a view illustrating one example of a computer that executes a transfer program.
Figure 13:
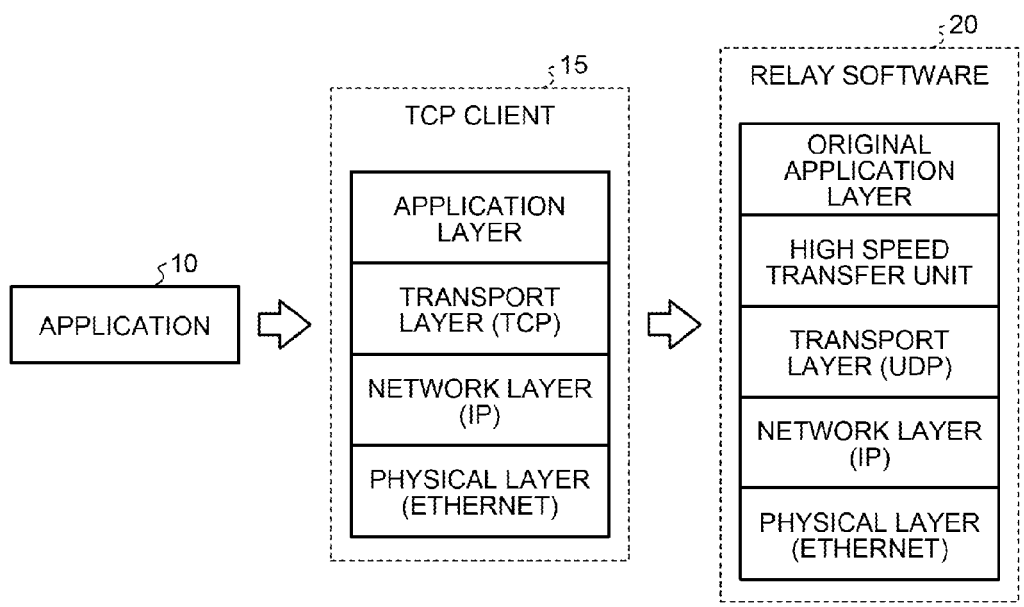
FIG. 13 is a view for explaining one example of a conventional technique.
Figure 14:
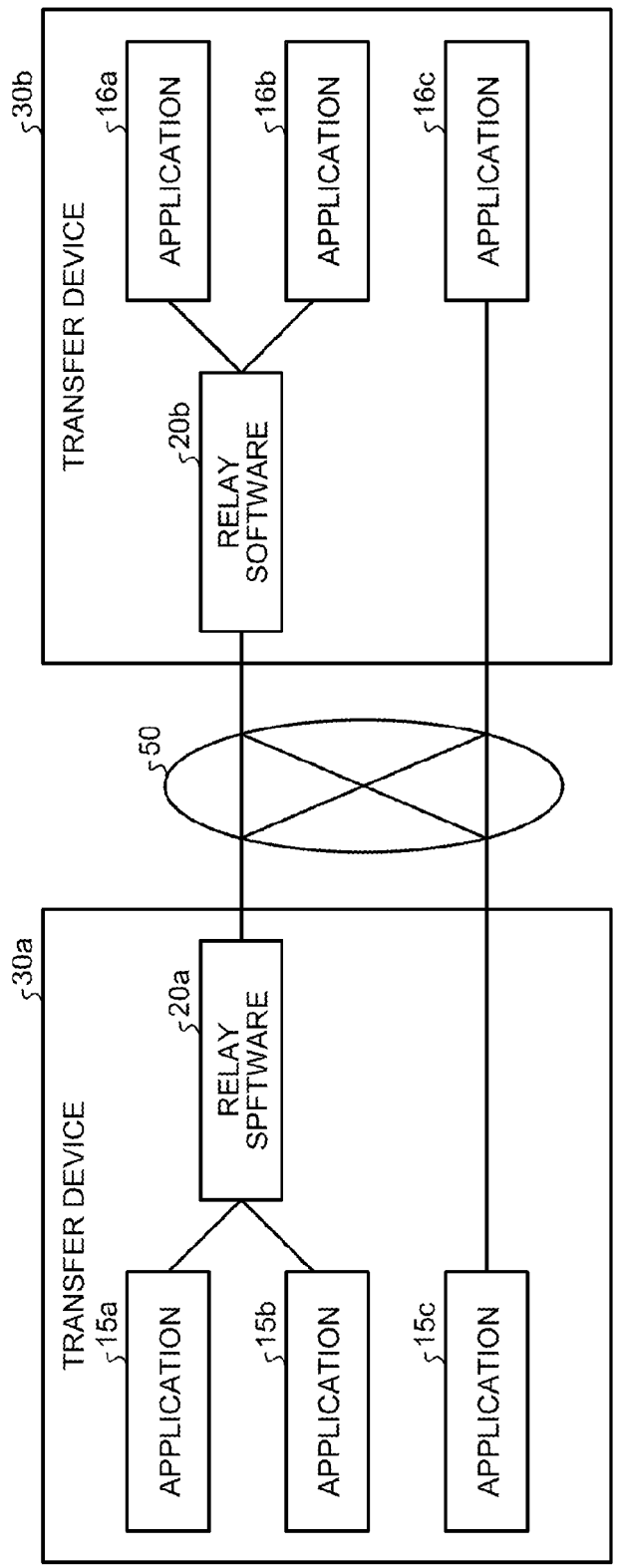
FIG. 14 is a view for explaining the problem in the conventional technique.

Next, one example of a computer that executes a transfer program capable of providing the function same as that of the transfer device 100 or 200 exemplified in each embodiment is explained. FIG. 12 is a view illustrating one example of a computer that executes a transfer program.

As illustrated in FIG. 12, a computer 300 has a CPU 301 that executes various kinds of arithmetic processing, an input unit 302 that accepts the input of data from a user, and a display 303. Furthermore, the computer 300 has a reader 304 that reads out a program or the like from a storage medium, and an interface unit 305 through which data is transmitted to or received from the other computer via a network. In addition, the computer 300 has a RAM 306 that temporarily stores therein various kinds of information, and a hard disk drive 307. Here, the devices 301 to 307 are respectively connected to a bus 308.

The hard disk drive 307 has, for example, a transmission control program 307a and a reception control program 307b. The CPU 301 reads out each of the programs 307a and 307b to load on the RAM 306.

The transmission control program 307a functions as a transmission control process 306a. The reception control program 307b functions as a reception control process 306b.

For example, the transmission control process 306a corresponds to the transmission control unit 106. The reception control process 306b corresponds to the reception control unit 206.

Here, it is unnecessary to store each of the programs 307a and 307b in the hard disk drive 307 in advance. For example, each program may be stored in a "portable physical medium" such as a flexible disk (FD), a CD-ROM, a DVD, a magneto-optical disk, or an IC card, and the computer 300 may read out each of the programs 307a and 307b from the medium to execute each program.

Here, in the processing in the present embodiment, transmission is performed by UDP communication; however, a communication scheme is not limited to the UDP communication. For example, a connectionless communication protocol may be used. The connectionless communication is a communication scheme in data communication such that a transfer device unilaterally transmits data without confirming the status of a communication partner or that transfer devices transmit data to each other in such a manner as above.

The transfer device disclosed in the present invention provides an advantageous effect of preventing congestion in retransmission of data even in the case of a group of applications with a small amount of data communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transfer device comprising:
a processor that executes a process including:
calculating a communication band to be allocated to each of groups of transmission sources and transmission destinations, wherein the calculating calculates the communication band according to a bit rate=min(b,R)+ Bnow*(T*R)/TotalSize, the min(b,R) being a function that selects a value of smaller one out of b and R, b being a value set by a user, R being a total size of re transmission packets retransmitted to another transfer device, the Bnow being a remaining band value obtained by subtracting a total value of the minimum band value to be allocated to each groups of the transmission sources and the transmission destinations from the maximum band value, the minimum band value and the maximum band being a value set by a user, T being a total size of TCP packets per unit time, TotalSize being a total value of data amounts per unit time in a data communication between a transmission source and a transmission destination;
allocating the communication band calculated to the corresponding group:
converting, within the communication band allocated to each group, data to conversion data transmitted and received with a protocol different from a protocol with which the data is received from the corresponding transmission source;
transferring the conversion data to the corresponding transmission destination; and
performing data transfer of retransmission data in response to a retransmission request of the conversion data before transferring remaining conversion data which has not been transmitted to the corresponding transmission destination, within a range of the communication band.

2. The transfer device according to claim 1, the process further comprising:
sequentially receiving conversion data from another transfer device, recording identification information for uniquely identifying the conversion data received in the form of tree-structured data; and identifying conversion data subject to the retransmission request based on the tree-structured data.

3. A transfer method executed by a computer, the transfer method comprising:
calculating a communication band to be allocated to each of groups of transmission sources and transmission destinations, wherein the calculating calculates the communication band according to a bit rate=min(b,R)+ Bnow*(T*R)/TotalSize, the min(b,R) being a function that selects a value of smaller one out of b and R, b being a value set by a user, R being a total size of re transmission packets retransmitted to another transfer device, the Bnow being a remaining band value obtained by subtracting a total value of the minimum band value to be allocated to each groups of the transmission sources and the transmission destinations from the maximum band value, the minimum band value and the maximum band being a value set by a user, T being a total size of TCP packets per unit time, TotalSize being a total value of data amounts per unit time in a data communication between a transmission source and a transmission destination;
allocating the communication band calculated to the corresponding group;
converting, within the communication band allocated to each group, data to conversion data transmitted and received with a protocol different from a protocol with which the data is received from the corresponding transmission source;
transferring the conversion data to the corresponding transmission destination; and
performing data transfer of retransmission data in response to a retransmission request of the conversion data before transferring remaining conversion data which has not been transmitted to the corresponding transmission destination, within a range of the communication band.

4. The transfer method according to claim 3, further comprising:
sequentially receiving conversion data from another transfer device, recording identification information for uniquely identifying the conversion data received in the form of tree-structured data, and identifying conversion data subject to the retransmission request based on the tree-structured data.

5. A non-transitory computer-readable recording medium having stored therein a program for causing a computer to execute a transfer process comprising:
calculating a communication band to be allocated to each of groups of transmission sources and transmission destinations, wherein the calculating calculates the communication band according to a bit rate=min(b,R)+ Bnow*(T*R)/TotalSize, the min(b,R) being a function that selects a value of smaller one out of b and R, b being a value set by a user, R being a total size of re transmission packets retransmitted to another transfer device, the Bnow being a remaining band value obtained by subtracting a total value of the minimum band value to be allocated to each groups of the transmission sources and the transmission destinations from the maximum band value, the minimum band value and the maximum band being a value set by a user, T being a total size of TCP packets per unit time, TotalSize being a total value of data amounts per unit time in a data communication between a transmission source and a transmission destination;
allocating the communication band calculated to the corresponding group;

converting, within the communication band allocated to each group, data to conversion data transmitted and received with a protocol different from a protocol with which the data is received from the corresponding transmission source;

transferring the conversion data to the corresponding transmission destination; and performing data transfer of retransmission data in response to a retransmission request of the conversion data before transferring remaining conversion data which has not been transmitted to the corresponding transmission destination, within a range of the communication band.

6. The non-transitory computer-readable recording medium according to claim 5, the transfer process causing the computer to further execute:

sequentially receiving conversion data from another transfer device, recording identification information for uniquely identifying the conversion data received in the form of tree-structured data, and identifying conversion data subject to the retransmission request based on the tree-structured data.

7. The transfer device according to claim 1, wherein the calculating calculates the communication band according to the bit rate=min(b,R)+Bnow*(T*R)/TotalSize, when the TotalSize is larger than the maximum band.

8. The transfer method according to claim 3, wherein the calculating calculates the communication band according to the bit rate=min(b,R)+Bnow*(T*R)/TotalSize, when the TotalSize is larger than the maximum band.

9. The non-transitory computer-readable recording medium according to claim 5, wherein the calculating calculates the communication band according to the bit rate=_min(b,R)+Bnow*(T*R)/TotalSize, when the TotalSize is larger than the maximum band.

* * * * *